Patented Dec. 22, 1925.

1,566,431

UNITED STATES PATENT OFFICE.

SØREN SAK, OF COPENHAGEN, DENMARK, ASSIGNOR, BY MESNE ASSIGNMENTS, TO THE FLEISCHMANN COMPANY, OF NEW YORK, N. Y., A CORPORATION OF OHIO.

PROCESS FOR PRODUCTION OF YEAST.

No Drawing. Application filed December 14, 1920, Serial No. 430,773. Renewed November 7, 1925.

*To all whom it may concern:*

Be it known that SØREN SAK, residing in Copenhagen, Denmark, has invented certain new and useful Improvements in Processes for Production of Yeast, of which the following is a specification.

This invention relates to a process for the manufacture of yeast, and particularly to a process for manufacturing a compressed baker's yeast, and has for its object an improved procedure for the manufacturing of yeast in a more convenient and economical manner than heretofore.

In the processes for production of yeast as now practised, the yeast to be used for propagation the seed-yeast is either sown into the total quantity of mash, as by the skim-yeast (Vienna-yeast) method or, according to the air-grown yeast method, the yeast is sown into the first wort which is then, during aeration, diluted by the addition of washing water so as to make a certain definite quantity of final wort, wherein the fermentation is completed.

In both cases the yeast propagates in a mash or wort which, during the fermentation, becomes continuously poorer in nutritive substance, one of the reasons for this being the consumption of substance caused by the propagation of the yeast. By the air-grown yeast method, the concentration of the nutritive liquid is reduced not merely because of the consumption of substance due to the propagation of the yeast, but also because the nutritive solution is diluted by the addition of washing water during the entire washing process. By the methods above referred to, the individual yeast generations will develop under highly different conditions of life, their development commencing in a nutritive liquid of high concentration, i. e. in a surplus of nutritive substance, while the last generations will develop under unfavourable conditions of life i. e. in a weaker nutritive solution, lacking nutritive substance. Furthermore, the alcohol formed during the fermentation, according to the above mentioned methods of fermentation, will have a retarding effect on the formation of yeast. The retarding action of alcohol on the yeast formation is especially prominent in the skim-yeast (Vienna-yeast) method. In the air-grown yeast method, it has been attempted to remedy this disadvantage by selecting suitably weak solutions, in which the alcohol formed could not materially injure the propagation of yeast; but this results in the loss of the alcohol as it is not feasible, in practice, to recover the alcohol when it is present in a dilution carried beyond a certain limit.

Despite the attempts to remedy the unsatisfactory conditions just explained, there remains the main disadvantage that the yeast, during its development, must always work in a wort or mash becoming constantly poorer in nutritive substance, so that the later generations must fight against conditions of life becoming constantly more unfavorable.

By the practice of the present invention a process is provided wherein the yeast is given, as far as possible, controlled and favorable conditions of life during the entire fermentation process without using other nutritive substances than those utilized in the present fermentation processes. This result is made possible if the usual nutritive substances, such as mash and wort, are supplied to the yeast in the manner hereinafter described, and which is entirely different from present practice.

Experience has shown that the desired result will be attained, if the yeast is sown in a diluted wort or mash suitable for the propagation of yeast, and if the concentration of the nutritive liquid is maintained by equalization or compensation of the consumption of substances in a manner easily carried out in practice. In contradistinction to the prevailing practice, the process may be commenced by sowing the yeast into the last or a mixture of the last and the last but one washing water, the term "washing water" being taken to mean the liquid flowing from the filtration plant. Thereupon addition is made of the stronger washing waters obtained at the beginning of the filtration, and of the first wort, all according to requirements, in order that the concentration may be maintained in spite of the consumption of substances.

Extensive practical experiments with the present invention have shown that, in the production of good bakery yeast giving an uncommonly large yield, considerable quantities of alcohol are present during the fermentation, and the process should therefore be carried out so that not only such considerable quantities of alcohol are formed and are present during the fermentation, but also so that the alcohol is not utilized by the yeast until during the further progress of the fermentation; the alcohol being then burned (oxydated) or assimilated. The object aimed at is to provide an easily performable approximate compensation or equalization for the variations, due to consumption of substance, occurring in the concentration of the fermenting wort or mash.

According to the present invention, the concentrations during the fermentation are not only regulated in such a manner that they are favorable to the propagation of yeast, but also in such a manner that they give a quite appreciable yield of alcohol, so that the alcohol thus formed may either be caused to disappear again slowly during the process, or may be caused to remain, wholly or partly, as desired.

By means of the new process, the formation and conversion of alcohol is regulated simultaneously with the attainment of high yields of the best yeast. In the present process there may be used, per unit volume of the fermenting solution, quantities of mashing material corresponding at least to those used by the older air-grown yeast method. Consequently relatively smaller quantities of air may be used than in those processes in which smaller quantities of mashing material, per unit volume of fermenting solution, are used.

It will also be apparent that the present process offers advantages in respect to increased capacity of the plants. The advantages attained by the process greatly outweigh the costs of the increased supervision made necessary, especially at the start, when the process is introduced in a factory.

The yeast produced according to my process, while quite considerable quantities of alcohol are present, appears in quantities corresponding to a yield of about 60% or more and, besides, it possesses internal and external qualities of exceedingly high value.

In carrying out the process, for example, the following procedure may be followed:—

First a mash of 15° Bg. of the usual composition and prepared in the usual manner is filtered. The original wort and the first washing waters—a mixture whose concentration may vary between wide limits and whose specific gravity may be assumed to be about 10° B.—are conveyed into a special receptacle, in which the mixture, in order to avoid infections until it shall be used, is either heated to sufficiently high temperatures, for instance 70–75° C., or cooled to sufficiently low temperatures, for instance 12–15° C., the temperature of the fermenting vat being maintained throughout the period of propagation at the usual temperatures, namely 25–30° C. The third washing water or a portion thereof, mixed with the last washing water in such proportion that the strength of the mixture will be 1.5 to 2.5° Bg. is conveyed through the cooler to the fermenting vat where yeast is added, while the temperature is maintained at about 30° C. Thereafter aeration commences and then, after the lapse of 2 to 3 hours the more concentrated wort is added, preferably continuously and during intense aeration and in such a manner that the addition of the wort will take 10 to 11 hours. Then, during decreased aeration, the entire wort is allowed to ferment for one or two hours more, and the separation of the yeast then commences. As the wort contains quite uncommonly large quantities of yeast, it will be preferable to let some water run with it into the centrifugal straining apparatus.

During fermentation as specified above, alcohol will be produced in quantities which may amount to 20% or more of the raw material dependent upon the quantity of wort present in the fermentation vat.

In fermentations such as those here referred to, alcohol will be or may be present in sufficient concentration to enable it to be recovered commercially.

The usual nutritive salts may be added in the usual manner, for instance during the fermentation, or even in the wort before the sterilization.

By a slight variation of the temperature, the aeration, or the manner in which the wort is added, the amount of alcohol present at the end of the process may be varied.

The present process thus permits the manufacture to be adjusted to suit the varying state of the market for yeast and alcohol.

The invention herein disclosed is particularly adapted for use in conjunction with the process described in United States Patent No. 1,449,105 issued March 20, 1923.

This application is a continuation in part of my copending application, Serial No. 320,564, filed August 29, 1919.

Having described my invention, what I claim as new and desire to secure by Letters Patent, is:

1. A process of propagating yeast which comprises preparing a yeast-nutrient mash, filtering the same, washing the residue, initiating propagation of yeast with aeration in the wash water, and during the period of propagation substantially continuously adding the original wort.

2. A process of propagating yeast which comprises preparing a yeast-nutrient mash, filtering the same, initiating propagation of yeast with aeration in a later portion of the wash water, and during the period of propagation substantially continuously adding the original wort and the remaining portions of the wash water.

3. A process of propagating yeast which comprises preparing a yeast-nutrient mash, filtering the same, reserving the filtered wort at such a temperature that infection is substantially avoided, washing the residue, initiating propagation of the yeast with aeration in a portion of the wash water and during the period of propagation substantially continuously adding the filtered wort and maintaining the propagating liquid substantially within the temperature range of 25–30° C.

4. A process of propagating yeast which comprises preparing a yeast-nutrient mash, filtering the same, reserving the filtered wort at a relatively high temperature to avoid infection, washing the residue, initiating propagation of the yeast with aeration in a portion of the wash water and during the period of propagation substantially continuously adding the filtered wort and maintaining the propagating liquid substantially within the temperature range of 25–30° C.

5. A process of propagating yeast which comprises preparing a yeast-nutrient mash containing cereal material, filtering the same, repeatedly washing the residue, initiating propagation of yeast with aeration in a portion of a wash water, and during the period of propagation substantially continuously adding the original wort and the remaining portions of the wash waters.

6. A process of propagating yeast which comprises preparing a yeast-nutrient mash containing cereal material, filtering the same, reserving the filtered wort at such a temperature that infection is substantially avoided, repeatedly washing the residue, initiating propagation of yeast with aeration in a portion of a wash water, and during the period of propagation substantially continuously adding the original wort and the remaining portions of the wash waters.

7. The process of propagating yeast which comprises preparing a yeast-nutrient mash, filtering the same, washing the residue to secure washing waters of varying degrees of concentration, initiating propagation of yeast with aeration in a washing water of relatively low concentration and thereafter substantially continuously adding the original wort and a washing water of higher concentration.

8. In the art of yeast manufacturing, the improvement in carrying out a continuous process for the production of high yields of yeast, which comprises preparing a yeast nutrient solution, initiating the propagation of yeast with aeration in a yeast nutrient solution of relatively low concentration with respect to the first named solution, substantially continuously adding during the period of propagation the first named solution at a rate such that during the first portion of the period of propagation, the concentration of the propagating liquid is of a degree adapted to produce a substantial quantity of alcohol, and that during the latter portions of the period of propagation, the concentration of the propagating liquid is of a degree in which the alcohol produced is substantially totally assimilated.

9. In the art of yeast manufacturing, the improvement in carrying out a continuous process which comprises the steps of preparing a yeast-nutrient mash, filtering the same, washing the residue, and initiating propagation of yeast with aeration in the wash water.

10. In the art of yeast manufacturing, the improvement in carrying out a continuous process which comprises the steps of preparing a yeast-nutrient mash, filtering the same, washing the residue, and initiating propagation of yeast with aeration in the wash water, and during the period of propagation substantially continuously adding the filtered wort and maintaining the propagating liquid substantially within a temperature range of 25–30° C.

In testimony whereof he affixes his signature.

SØREN SAK.